(12) United States Patent
Tamai

(10) Patent No.: US 11,734,206 B2
(45) Date of Patent: Aug. 22, 2023

(54) INFORMATION PROCESSING DEVICE

(71) Applicant: OMRON Corporation, Kyoto (JP)

(72) Inventor: Toshinori Tamai, Nara (JP)

(73) Assignee: OMRON Corporation, Kyoto (JP)

( * ) Notice: Subject to any disclaimer, the term of this patent is extended or adjusted under 35 U.S.C. 154(b) by 50 days.

(21) Appl. No.: 17/605,555

(22) PCT Filed: Mar. 2, 2020

(86) PCT No.: PCT/JP2020/008704
§ 371 (c)(1),
(2) Date: Oct. 21, 2021

(87) PCT Pub. No.: WO2020/230413
PCT Pub. Date: Nov. 19, 2020

(65) Prior Publication Data
US 2022/0206967 A1    Jun. 30, 2022

(30) Foreign Application Priority Data

May 16, 2019 (JP) .................................. 2019-093182

(51) Int. Cl.
*G06F 13/36* (2006.01)
*G06F 13/16* (2006.01)
*G06F 13/42* (2006.01)

(52) U.S. Cl.
CPC ...... *G06F 13/1668* (2013.01); *G06F 13/4282* (2013.01)

(58) Field of Classification Search
None
See application file for complete search history.

(56) References Cited

U.S. PATENT DOCUMENTS

| 5,444,855 A | 8/1995 | Thompson |
| 2006/0198605 A1* | 9/2006 | Onoue ................. H04N 23/633 348/E5.042 |
| 2007/0204074 A1 | 8/2007 | Ishida et al. |
| 2010/0195466 A1* | 8/2010 | Nosaka .................... G11B 7/28 369/84 |

(Continued)

FOREIGN PATENT DOCUMENTS

| JP | H0991194 | 4/1997 |
| JP | 2005115421 | 4/2005 |

(Continued)

OTHER PUBLICATIONS

"International Search Report (Form PCT/ISA/210) of PCT/JP2020/008704," dated Jun. 2, 2020, with English translation thereof, pp. 1-4.

(Continued)

*Primary Examiner* — Henry Tsai
*Assistant Examiner* — Dean Phan
(74) *Attorney, Agent, or Firm* — JCIPRNET

(57) ABSTRACT

Provided is a unit that causes transmission of smallest payload data to a communication interface to be in standby during a time period from a time, at which it is determined that a transmission time of smallest payload data exceeds a reference value during a control cycle, to a time at which the communication interface transmits the smallest payload data to be transmitted next after the most recent smallest payload data transmitted at the time.

8 Claims, 7 Drawing Sheets

(56) References Cited

U.S. PATENT DOCUMENTS

2013/0028121 A1* 1/2013 Rajapakse ............ H04L 69/163
                                                        370/252
2013/0031283 A1   1/2013 Tsuji
2018/0191403 A1* 7/2018 Pierson ................ H04B 7/0602

FOREIGN PATENT DOCUMENTS

| JP | 2008250985 | 10/2008 |
|---|---|---|
| JP | 2016192172 | 11/2016 |
| JP | 2017142730 | 8/2017 |
| KR | 20180131095 | 12/2018 |

OTHER PUBLICATIONS

"Written Opinion of the International Searching Authority (Form PCT/ISA/237) of PCT/JP2020/008704," dated Jun. 2, 2020, with English translation thereof, pp. 1-8.

"Search Report of Europe Counterpart Application", dated Jun. 6, 2023, p. 1-p. 9.

* cited by examiner

INFORMATION PROCESSING DEVICE

CROSS-REFERENCE TO RELATED APPLICATION

This application is a 371 application of the International PCT application serial no. PCT/JP2020/008704, filed on Mar. 2, 2020, which claims the priority benefits of Japan Patent Application No. 2019-093182, filed on May 16, 2019. The entirety of each of the above-mentioned patent applications is hereby incorporated by reference herein and made a part of this specification.

TECHNICAL FIELD

The present invention relates to an information processing device operated in cooperation with a control device that executes control of a control object.

BACKGROUND

In the related art, in order to reduce a processing load of an industrial controller, an industrial control system of a type that uses various units operated in cooperation with a controller together is known. In such a system, the controller and the units share the same memory, and the controller or the units may be operated to access the shared memory and read and write data. However, when the controller and the units can disorderly access the shared memory, "memory contention" will occur because each access occurs at the same timing, and as a result, reading/writing of data to be processed with priority may be delayed.

Here, in the related art, examples of technologies for avoiding occurrence of such memory contention are proposed in, for example, Patent Literatures 1 and 2.

Patent Literature 1 discloses a memory access arbitration device including a first control unit configured to output a request signal to obtain use permission of the shared memory at a random timing, a second control unit configured to output a request signal to obtain use permission of the shared memory at each constant cycle, and an arbitration unit configured to arbitrate the request signal output from each of the first control unit and second control unit, wherein a determination unit configured to receive the output of the request signal from the second control unit and output an ack prohibition signal that prohibits the arbitration unit from outputting an ack signal to the first control unit to the arbitration unit is provided.

Patent Literature 2 discloses an arbitration system configured to arbitrate use requests of a plurality of devices with respect to a shared resource according to a prescribed priority ranking and selectively permit use of the shared resource, including a time counting part configured to count a time from a use request permission start of a specific device having a need to transfer data within a constant time in the plurality of devices that are arbitration objects to the next use request permission start and generate a timeout signal when it is detected that selection of the use request permission of the specific device is not within a predetermined time, and an arbitration unit configured to permit a use request of the specific device at each constant time by changing a priority ranking of the specific device to the highest or at least the second highest according to the timeout signal from the time counting part.

CITATION LIST

Patent Literature

[Patent Literature 1]
Japanese Patent Laid-Open No. 2005-115421
[Patent Literature 2]
Japanese Patent Laid-Open No. H09-91194

SUMMARY OF INVENTION

Technical Problem

In the technology of Patent Literature 1, both of the first control unit and the second control unit need to access to the arbitration unit to arbitrate and receive the access to the memory. For this reason, for example, when the first control unit is used as a CPU of an industrial controller, since a processing load (request transmission, ACK reception, or the like) of the CPU for arbitration is increased, a control cycle of the CPU is increased. As a result, there is a problem that the CPU cannot execute processing in a constant cycle.

Even in the technology of Patent Literature 2, the plurality of devices and the one CPU need to access the arbitration circuit to avoid memory contention. Accordingly, since the processing load (request transmission, ACK reception, or the like) of the CPU for arbitration is increased, the control cycle of the CPU becomes longer. As a result, there is a problem that the CPU cannot execute processing in a constant cycle.

In order to solve the above-mentioned problems, an objective of the present invention is to prevent occurrence of memory contention without executing arbitration processing in a computation unit of a control device to prevent the memory contention.

Solution to Problem

An information processing device according to an aspect of the present invention is an information processing device connected to a control device including a first memory connected to a serial bus, and a first communication part connected to the serial bus and configured to communicate with the first memory via the serial bus, the information processing device including: a generating part configured to generate a plurality of pieces of smallest payload data from communication data transmitted to the first memory via the serial bus; a transmission part configured to sequentially transmit the smallest payload data to the first memory via the serial bus at each constant time; a computation part configured to calculate a transmission time of the smallest payload data transmitted by the transmission part at a first point of time; a determination part configured to determine whether the calculated transmission time exceeds a predetermined reference value; and a transmission control part configured to cause the transmission part to stand by for transmission of the smallest payload data during a constant duration from a second point of time when it is determined that the transmission time has been determined as exceeding the reference value to a third point of time when the transmission part transmits the smallest payload data transmitted after the latest smallest payload data that has been transmitted at the second point of time.

Advantageous Effects of Invention

According to the aspect of the present invention, it is possible to minimize occurrence of memory contention

DESCRIPTION OF EMBODIMENTS

Embodiment 1

Hereinafter, an embodiment related to one aspect of the present invention (hereinafter, referred to as "the embodiment") will be described with reference to the accompanying drawings.

§ 1 Application Example

Figure 1:
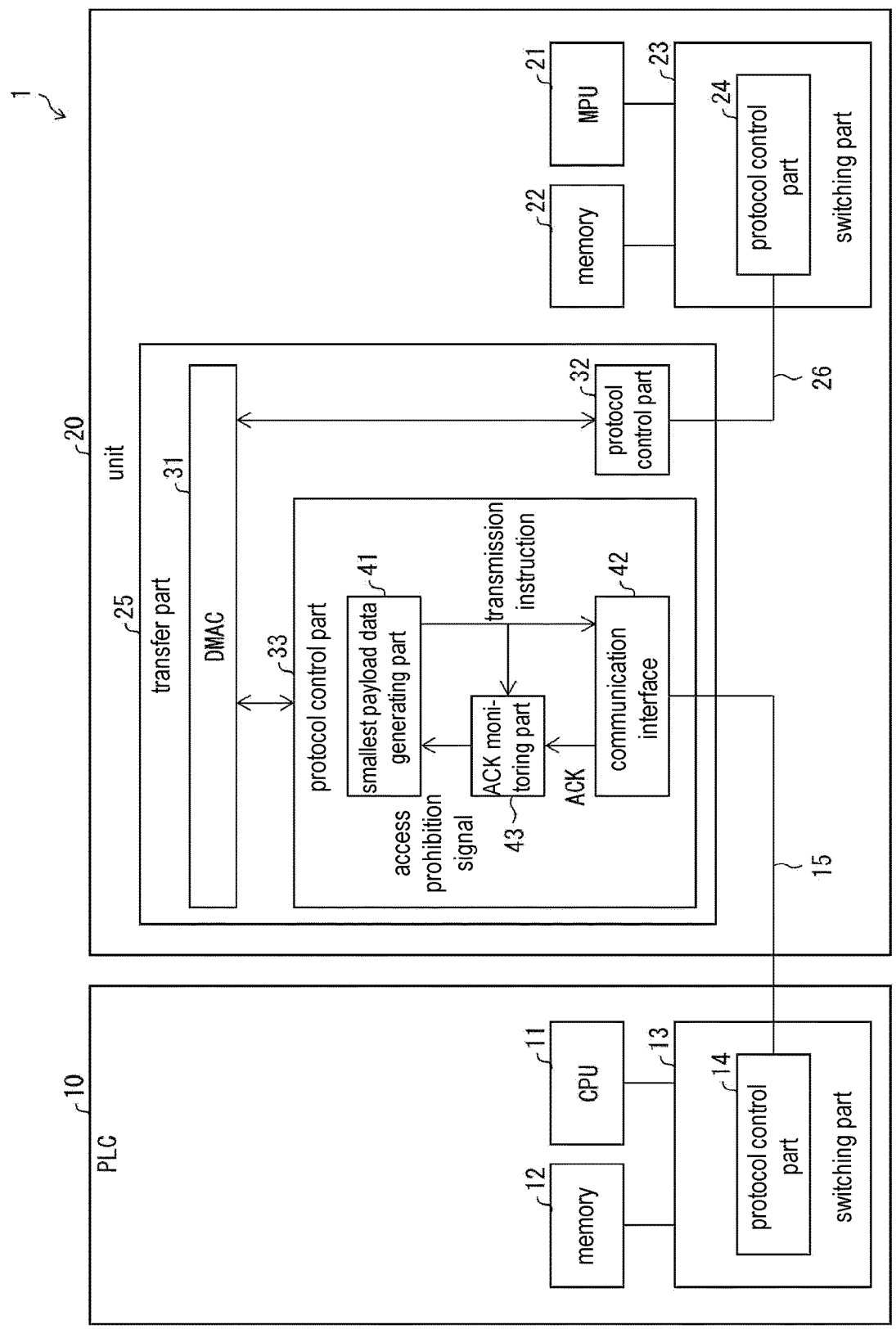
FIG. 1 is a block diagram showing a major part configuration of a control system according to Embodiment 1 of the present invention.

First, an example of a situation to which the present invention is applied will be described with reference to FIGS. 1 and 2. As shown in FIG. 1, a unit 20 according to the embodiment is an information processing device connected to a PLC 10 in a control system 1 and operates in cooperation with the PLC 10. A protocol control part 33 in the unit 20 shares a CPU 11 in the PLC 10 and a memory 12 in the PLC 10, both of which communicate with the memory 12 via a serial bus 15. That is, the CPU 11 and the protocol control part 33 share the memory 12. A combination configured to prevent memory contention between the CPU 11 and the protocol control part 33 is incorporated in the control system 1.

Figure 2:
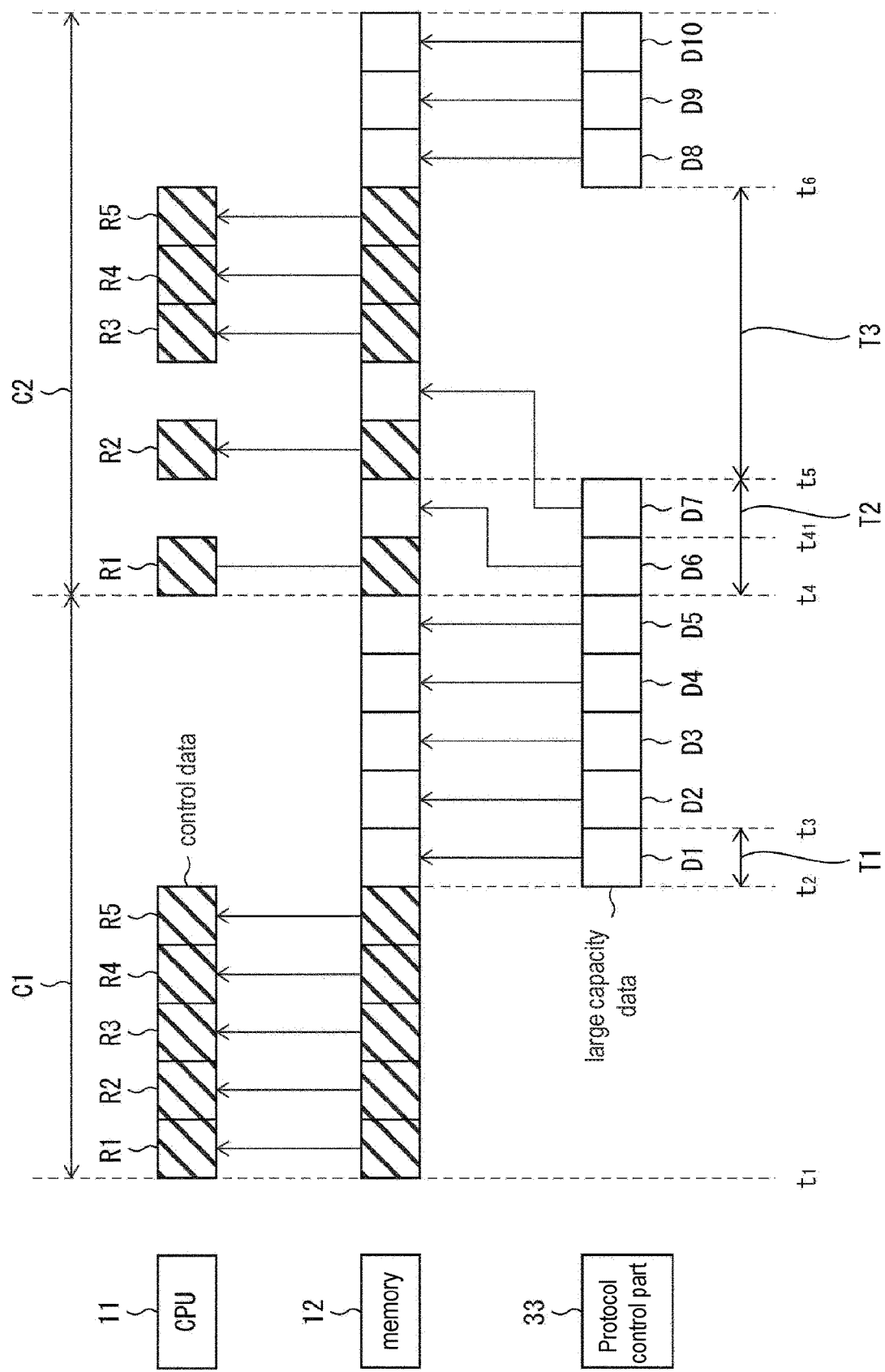
FIG. 2 is a sequence diagram showing an example of a flow of processing by the control system according to Embodiment 1 of the present invention.

As shown in FIG. 2, when a predetermined control cycle is started, the PLC 10 reads control data (first data) from the memory 12 to control a control object in the control system 1 and transmits the data to the control object. The protocol control part 33 of the unit 20 divides large capacity data into a plurality of pieces of smallest payload data, and transmits each piece of smallest payload data to the memory 12 via the serial bus 15 in the control cycle. When transmission of the control data and transmission of the large capacity data simultaneously occur in the serial bus 15, so-called memory contention can occur between the CPU 11 and the protocol control part 33.

The protocol control part 33 calculates a transmission time T2 of smallest payload data D6 transmitted to the memory 12 at a time t4 based on, for example, a time t5 when ACK with respect to the smallest payload data D6 is received. When it is determined that the calculated transmission time T2 exceeds a predetermined reference value set in the unit 20, the protocol control part 33 assumes that memory contention occurs between the CPU 11 and the protocol control part 33, and transmission of smallest payload data D8 transmitted subsequently to smallest payload data D7 upon transmission at an ACK reception point of time is on standby for a predetermined duration T3. Accordingly, since transmission of the large capacity data is on standby during the duration T3, even when the CPU 11 continues transfer of the control data in the duration T3, memory contention does not easily occur. As a result, in each control cycle, occurrence of memory contention between the CPU 11 and the protocol control part 33 can be minimized.

§ 2 Configuration Example (Configuration of Control System 1)

FIG. 1 is a block diagram showing a major part configuration of the control system 1 according to the embodiment. In the example shown, the control system 1 includes the programmable logic controller (PLC) 10 (a control device) and the unit 20. The PLC 10 of FIG. 1 includes the central processing unit (CPU) 11 (a first communication part), the memory 12 (a first memory), a switching part 13, a protocol control part 14, and the serial bus 15. The unit 20 in FIG. 1 includes an MPU 21, a memory 22 (a second memory), a switching part 23, a protocol control part 24, and a transfer part 25. The transfer part 25 in FIG. 1 includes a direct memory access controller (DMAC) 31 (a second communication part), a protocol control part 32, and the protocol control part 33. The protocol control part 33 includes a smallest payload data generating part 41 (a generating part, a transmission control part), a communication interface 42 (a transmission part, a reception part, an acquisition part), and an ACK monitoring part 43 (a computation part, a determination part).

The control system 1 is a system configured to control production facilities in which a plurality of control objects such as various instruments or facilities (not shown) are installed. The PLC 10 is a type of controller configured to control these control objects in the control system 1. The PLC 10 and the control objects are connected to a network of a control system such as a field network or the like (not shown). The PLC 10 transmits and receives various control data to the control object and thus controls the production facilities by periodically communicating with the control objects via the network of the control system. The PLC 10 further generates large capacity data used for statistics processing or the like of an operational status or the like of the control system 1 on the basis of the data collected from each of the control objects, and stores the data in the memory 12.

The unit 20 is a device (an information processing device) connected to the PLC 10 and operates in cooperation with the PLC 10. In the embodiment, the unit 20 takes charge of various types of processing applied to the large capacity data generated by the PLC 10 to reduce, for example, a processing load of the CPU 11 of the PLC 10. As such processing, for example, packet division processing, abnormality processing, and the like, are exemplified.

(Detailed Configuration of PLC 10)

In the PLC 10, each of the CPU 11, the memory 12, and the switching part 13 is connected to the serial bus 15. One end of the serial bus 15 is connected to the communication interface 42 in the protocol control part 33 of the unit 20.

The serial bus 15 is a communication route on which serial communication is executed, for example, a Peripheral Component Interconnect express (PCIe) bus.

The CPU 11 is a processor configured to generally control operations of the PLC 10. The memory 12 is any of various types of non-volatile recording media such as a read only memory (ROM) or the like. The switching part 13 switches a communication partner of the transfer part 25 to the CPU 11 or the memory 12. The CPU 11 can relay communication between the CPU 11 and the memory 12. Accordingly, the CPU 11 relays each of communication between the transfer part 25 and the memory 12 and communication between the transfer part 25 and the CPU 11. The protocol control part 14 transmits and receives data according to a communication protocol appropriate for serial communication on the serial bus 15.

Control data is stored in the memory 12 to control the control object in the control system 1. The CPU 11 reads the control data from the memory 12, and periodically transmits the data to the control object. The CPU 11 starts one control cycle upon occurrence of any event (for example, reading start of the control data) as a trigger. Then, while the control cycle continues, various types of controls (for example, transmission of the control data or the like) to be executed in each cycle are executed.

(Detailed Configuration of Unit 20)

The MPU 21, the memory 22, the switching part 23, and the DMAC 31 are connected to a serial bus 26 in the unit 20. Specifically, the DMAC 31 is connected to the serial bus 15 via the protocol control part 33. The DMAC 31 is also further connected to the serial bus 15 via the protocol control part 32. The serial bus 26 is, for example, a Peripheral Component Interconnect express (PCIe) bus. Both the CPU 11 and the DMAC 31 are connected to the memory 12 via the serial bus 15, and thus the CPU 11 and the DMAC 31 share the memory 12.

The micro processing unit (MPU) 21 is a processor configured to generally control operations of the unit 20. The MPU 21 executes various types of processing such as the above-mentioned packet division processing, abnormality processing, and the like. The memory 22 is various types of non-volatile recording media such as a read only memory (ROM) and the like. The large capacity data or the like transferred from the unit 20 is stored in the memory 22.

The switching part 23 switches a communication partner of the transfer part 25 to the MPU 21 or the memory 22. Accordingly, each of communication between the transfer part 25 and the memory 22 and communication between the transfer part 25 and the MPU 21 is relayed. The switching part 23 can also relay communication between the MPU 21 and the memory 22. The protocol control part 24 transmits and receives data to and from the protocol control part 32 according to a communication protocol appropriate for serial communication on the serial bus 26.

The transfer part 25 executes data transfer between the PLC 10 and the unit 20 according to control by the MPU 21 or the CPU 11. The DMAC 31 and the protocol control part 33 in the transfer part 25 take charge of communication with the memory 12 via the serial bus 15. The DMAC 31 is a controller configured to read and write large capacity data in the memory 12 through direct access to the memory 12 with no intervention of the CPU 11. The DMAC 31 transfers, for example, the large capacity data read from the memory 12 to the DMAC 31 through serial communication on the serial bus 15, further transfers the data to the memory 22 through serial communication on the serial bus 26, and thus writes the data on the memory 22. The DMAC 31 can also write the large capacity data read from the memory 22 on the memory 12 by transferring the data to the memory 12 through serial communication on the serial bus 15.

The protocol control part 32 cooperates with the protocol control part 24 and executes serial communication of data on the serial bus 15 according to a communication protocol appropriate for the serial communication on the serial bus 26.

The protocol control part 33 cooperates with the protocol control part 14 and executes serial communication of data on the serial bus 15 according to a communication protocol appropriate for the serial communication on the serial bus 15. The smallest payload data generating part 41 in the protocol control part 33 receives the large capacity data transferred to the memory 12 by the DMAC 31 from the DMAC 31, divides the data into a plurality of pieces of smallest payload data, and thus generates each piece of smallest payload data. The smallest payload data is data of a minimum unit communicated upon serial communication on the serial bus 15. The smallest payload data generating part 41 transmits the generated smallest payload data to the communication interface 42. The smallest payload data generating part 41 outputs the transmission instruction of the smallest payload data to the ACK monitoring part 43 and the communication interface 42 at each constant time. The communication interface 42 receives this and transmits each piece of smallest payload data to the memory 12 via the serial bus 15 one by one at each constant time.

The ACK monitoring part 43 monitors whether an ACK with respect to the transmitted smallest payload data is received. The ACK is a completion report indicating that the smallest payload data is written on the memory 12. The protocol control part 14 of the unit 20 transmits the ACK indicating that writing of the smallest payload data is terminated to the unit 20 via the serial bus 15 when the smallest payload data received from the unit 20 is written on the memory 12. The ACK monitoring part 43 can calculate a transmission time of the smallest payload data based on reception of the ACK.

(Flow of Data Transfer)

FIG. 2 is a sequence diagram showing an example of a flow of processing by the control system 1 according to the embodiment. The CPU 11 starts reading of the control data from the memory 12 at a time t1. In FIG. 2, the CPU 11 transfers the control data constituted by five pieces of smallest payload data R1 to R5 from the memory 12 to the CPU 11. The CPU 11 starts a control cycle C1 at the time t1. When a length of the control cycle C1 is indefinite and the CPU 11 completes processing of the control data read from the memory 12 and transmission to the control object, the control cycle C1 is terminated.

The protocol control part 33 does not start transmission of the large capacity data at the time t1. Accordingly, after the time t1, the CPU 11 continues transfer of the control data without causing memory contention with the transfer part 25. The CPU 11 completes transfer of the five pieces of smallest payload data R1 to R5 from the time t1 to a time t2, and thus completes transfer of the control data to the CPU 11 in the control cycle C1.

The transfer part 25 starts transmission of the large capacity data to the memory 12 at the time t2 in the control cycle C1. Here, the smallest payload data generating part 41 outputs a transmission instruction of smallest payload data D1 of the transmission object to the ACK monitoring part 43 and the communication interface 42. The ACK monitoring part 43 receives this and starts reception monitoring of the ACK with respect to the smallest payload data D1. The communication interface 42 receives this and transmits the smallest payload data D1 to the memory 12 via the serial bus 15. In the PLC 10, the protocol control part 14 receives the smallest payload data D1. Here, since the CPU 11 does not transfer the control data via the serial bus 15, memory contention does not occur. Accordingly, the protocol control part 14 writes the received smallest payload data D1 on the memory 12 with no delay. In the example in FIG. 2, writing of the smallest payload data D1 is terminated at a time t3. The protocol control part 33 transmits the ACK indicating that writing of the smallest payload data D1 is completed to the transfer part 25 via the serial bus 15 at the time t3.

The communication interface 42 in the transfer part 25 receives the ACK with respect to the smallest payload data D1 at the time t3 and outputs the ACK to the ACK monitoring part 43. The ACK monitoring part 43 calculates a transmission time T1 of the smallest payload data D1 based on the time t2 when the monitoring is started and the time t3 when the ACK is received. Here, the transmission time T1 is an elapsed time from the time t2 to the time t3. The ACK monitoring part 43 determines whether the calculated transmission time T1 exceeds a reference value at the time t3. The reference value greater than the transmission time T1 is set in the unit 20 in advance. Accordingly, the ACK monitoring part 43 determines that the transmission time T1 does not exceed the reference value at the time t3. Accordingly, a prohibition signal is not output to the smallest payload data generating part 41.

The smallest payload data generating part 41 outputs the transmission instruction of the next smallest payload data D2 to the ACK monitoring part 43 and the communication interface 42 at the time t3 because the prohibition signal is not input at the time t3. The ACK monitoring part 43 receives this and newly starts reception monitoring of the ACK with respect to the smallest payload data D2. The communication interface 42 transmits the input smallest payload data D2 to the memory 12 via the serial bus 15. After that, the same processing is repeated until the time t4 when the control cycle C1 is terminated. That is, since the control data is not transferred after the time t4, the transmission time of each of the pieces of smallest payload data D2 to D5 does not exceed the reference value. Accordingly, the transfer part 25 transmits and writes the smallest payload data D2 to D5 on the memory 12 in sequence with no delay without causing the memory contention. As a result, in the example of FIG. 2, the CPU 11 and the transfer part 25 do not cause memory contention throughout the control cycle C1.

The CPU 11 terminates the control cycle C1 at the time t4, and starts the next control cycle C2. The CPU 11 starts transfer of the smallest payload data R1 of the control data from the memory 12 to the CPU 11 at the time t4. Meanwhile, the protocol control part 33 transmits the smallest payload data D6 of the large capacity data to the memory 12 at the time t4 (a first point of time). As a result, since the CPU 11 and the protocol control part 33 access the memory 12 at the same time, memory contention occurs. The protocol control part 14 of the PLC 10 gives priority to the memory access by the CPU 11, reads the smallest payload data R1 from the memory 12, and transmits the data to the CPU 11. The transmission is terminated at the time t41. The CPU 11 starts transfer of the next smallest payload data R2 from the memory 12 at the time t41.

The time t41 is equal to a time when the transfer part 25 should start transmission of the next smallest payload data D7. The smallest payload data generating part 41 outputs the transmission instruction of the next smallest payload data D7 to the ACK monitoring part 43 and the communication interface 42 at the time t41 based on the lapse of the constant time after the time t4. Since the ACK monitoring part 43 has not yet received the ACK of the smallest payload data D6, even when a new transmission instruction is received, ACK reception monitoring of the smallest payload data D6 is continued. The communication interface 42 transmits the input smallest payload data D7 to the memory 12 via the serial bus 15 at the time t41.

The protocol control part 33 writes the smallest payload data D6, writing of which is on standby due to memory contention, on the memory 12 at the time t41. The writing is terminated at the time t5. The protocol control part 33 transmits the ACK with respect to the smallest payload data D6 to the transfer part 25 at the time t5.

The communication interface 42 receives the ACK with respect to the smallest payload data D6 at the time t5 (a second point of time) and outputs the ACK to the ACK monitoring part 43. The ACK monitoring part 43 calculates the transmission time T2 of the smallest payload data D6 based on the time t4 when the monitoring is started and the time t5 when the ACK is received. Here, the transmission time T2 is an elapsed time from the time t4 to the time t5. The ACK monitoring part 43 determines whether the calculated transmission time T2 exceeds the reference value at the time t5. In the example of FIG. 2, the transmission time T2 is substantially equal to a sum of the transmission time T1 when two pieces of smallest payload data are transmitted with no delay, and thus has a value of about two times the transmission time T1. Accordingly, the ACK monitoring part 43 determines that the transmission time T2 exceeds the reference value at the time t5. Accordingly, the prohibition signal is output to the smallest payload data generating part 41 at the time t5.

The time t5 is equal to a time when the transfer part 25 should start transmission of the next smallest payload data D8. The smallest payload data generating part 41 does not immediately output the transmission instruction of the next smallest payload data D8 based on the prohibition signal being input, and the output of the instruction transmission is on standby until the predetermined duration T3 (a constant duration) elapses to become a time t6 (a third point of time) after the time t5. The duration T3 is set to the unit 20 in advance as a standby duration in which transmission of the next smallest payload data is on standby at the communication interface 42 when the memory contention occurs. In the example of FIG. 2, the smallest payload data generating part 41 causes transmission of the next smallest payload data D8 to the memory 12 to be on standby at the communication interface 42 during the duration T3 from the time t4 to the time t5.

Reading of the smallest payload data R2 from the memory 12 and writing of the smallest payload data D7 on the memory 12 at the time t5 are not yet terminated. That is, the CPU 11 and the protocol control part 33 cause memory contention again. Execution of both of reading of the smallest payload data R2 and writing of the smallest payload data D7 is delayed to the duration T3. The protocol control part 14 reads the smallest payload data R1 from the memory 12 to transfer the data to the CPU 11, and then writes the smallest payload data D7 on the memory 12. After the time t5, the CPU 11 sequentially executes transfer of the remaining smallest payload data R3 to R5. All of the timings when this data is transferred to the CPU 11 are within the duration T3. During the duration T3, since transmission of the smallest payload data D8 is on standby, transmission of the large capacity data is not executed. Accordingly, the CPU 11 does not cause memory contention with respect to the smallest payload data R3 to R5, i.e., can read it out of the memory 12 with no delay. In the example of FIG. 2, the control data that causes memory contention is only the initial two pieces of smallest payload data R1 and R2, and none of the remaining three pieces of smallest payload data R3, R4 and R5 causes memory contention.

Comparative Example

Figure 3:
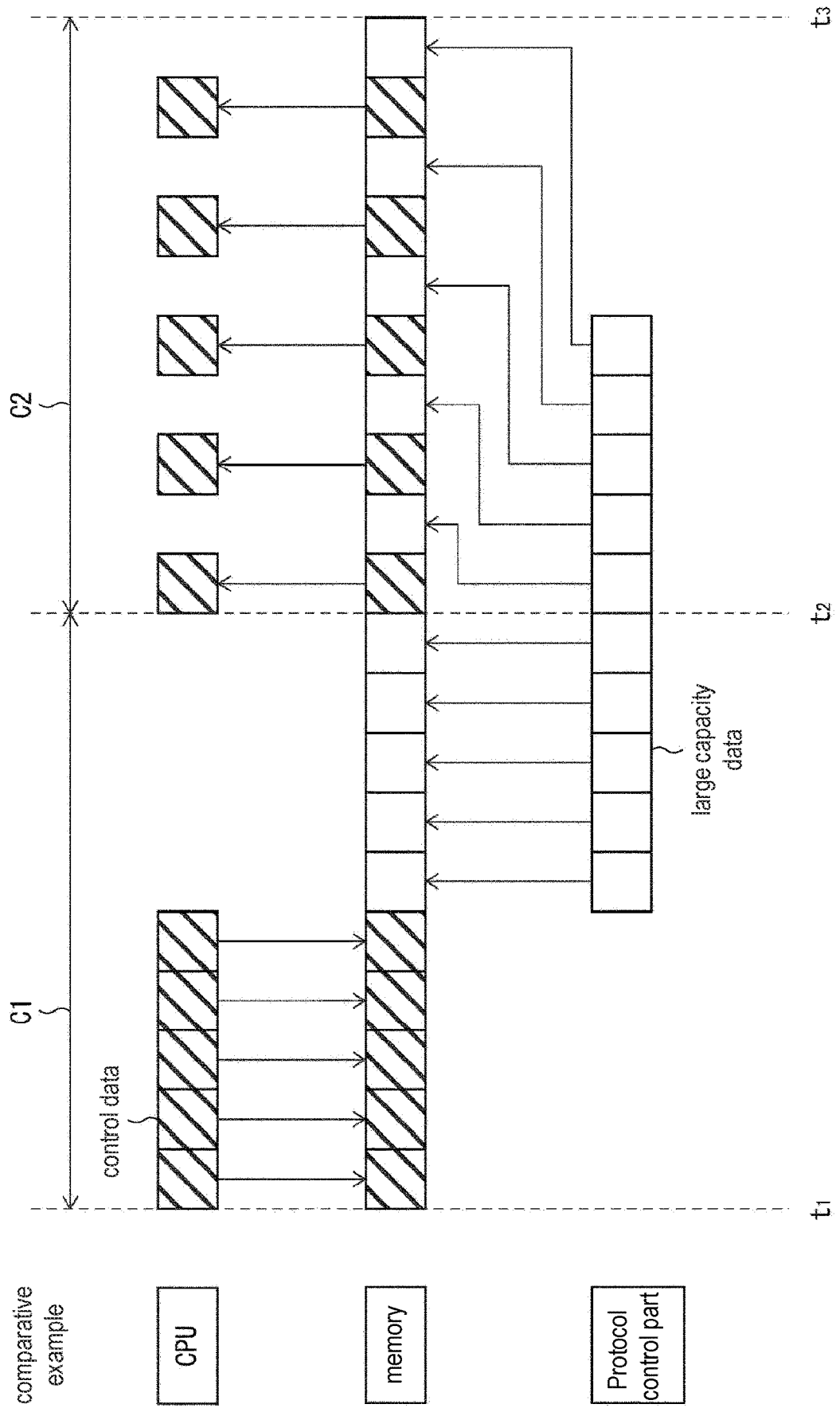
FIG. 3 is a sequence diagram showing an example of a flow of processing by a control system in the related art according to a comparative example.

FIG. 3 is a sequence diagram showing an example of a flow of processing by a control system in the related art according to a comparative example. In the comparative example, transmission standby processing of the smallest payload data as shown in FIG. 2 is not executed. For this reason, after the CPU 11 and the protocol control part 33 cause the memory contention at the time t2, the memory contention is not terminated in the control cycle C2, and the memory contention continues to occur till the termination point of time of the control cycle C2. That is, in the control cycle C2, all of five pieces of smallest payload data of the control data and five pieces of smallest payload data of the large capacity data cause the memory contention. Accordingly, each smallest payload data of the control data and each smallest payload data of the large capacity data will be transferred alternately and sequentially one by one.

(Main Effects)

As shown in FIG. 2, the smallest payload data generating part 41 causes transmission of the smallest payload data D8 to be on standby at the communication interface 42 in the duration T3 from the time t5 when it is determined that the transmission time T2 of the smallest payload data D6 exceeds the reference value in the control cycle C2 to the time t6 when the communication interface 42 transmits the smallest payload data D8, which is transmitted after the latest smallest payload data D7 is transmitted at the time t5. Accordingly, since transmission of the smallest payload data D8 of the large capacity data is on standby during the duration T3 after the time t3 when the memory contention occurs, the memory contention with respect to the smallest payload data R3 to R5 do not occur. As a result, occurrence of the memory contention in the control cycle C2 can be minimized compared to the comparative example shown in FIG. 3.

The ACK monitoring part 43 calculates the transmission time T1 of the smallest payload data D1 based on time t1 when transmission of the smallest payload data D1 is started and the time t2 when the ACK with respect to the smallest payload data D1 is received in the control cycle C1. In addition, in the control cycle C2, the ACK monitoring part 43 calculates the transmission time T2 of the smallest payload data D6 in the control cycle C2 based on the time t4 when transmission of the smallest payload data D6 is started and the time t5 when the ACK with respect to the smallest payload data D6 is received. In both cases, since the transmission time is calculated based on reception of the ACK with respect to one smallest payload data D1 or D6, a large time difference does not occur when an occurrence point of time of the memory contention due to transmission of certain smallest payload data and a point of time upon determination of whether the memory contention occurs. Accordingly, when the memory contention occurs, since the fact can be determined quickly, it is possible to quickly take a measure to minimize the memory contention upon occurrence thereof.

(Another Example of Transmission Time Calculation)

Figure 4:
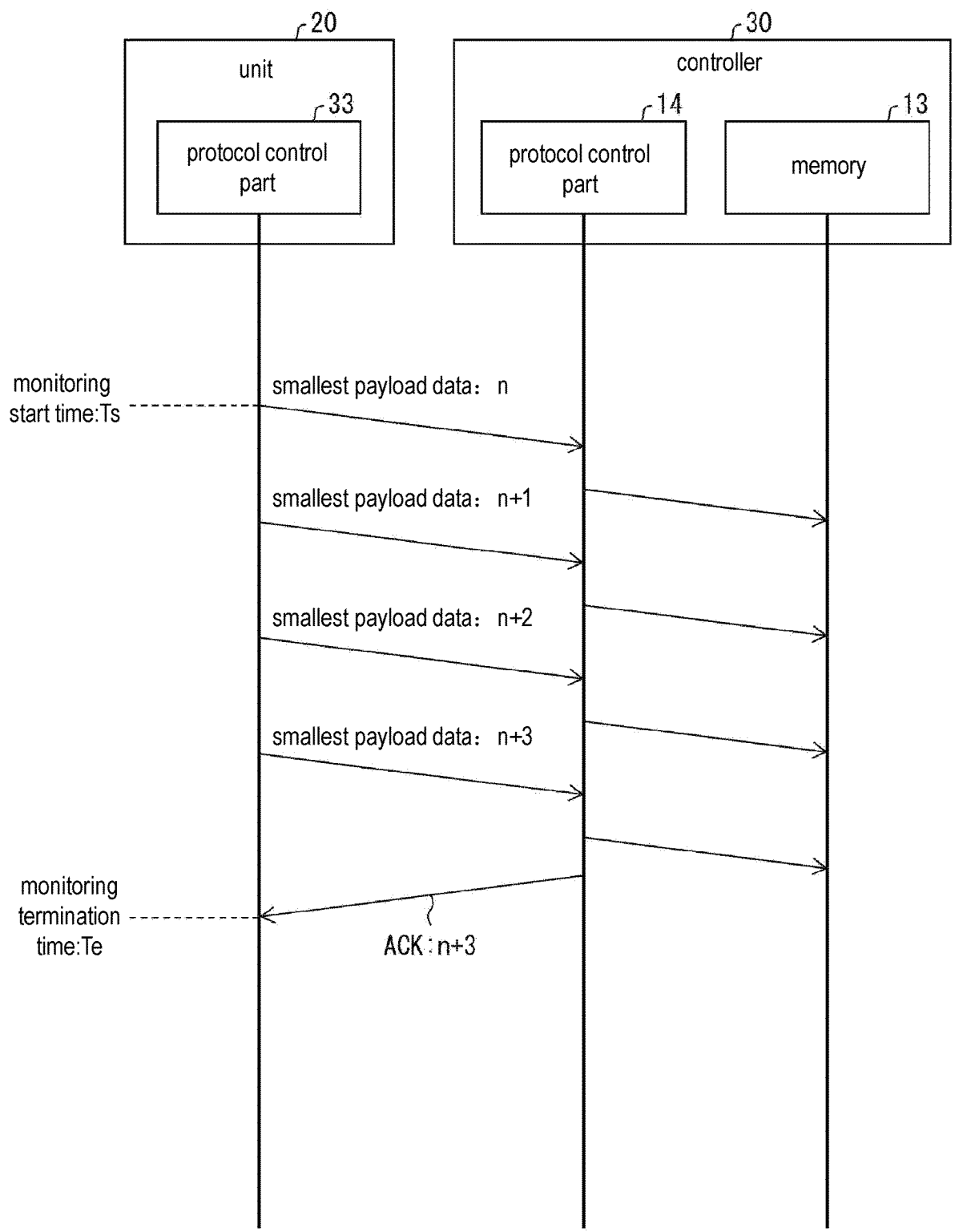
FIG. 4 is a sequence diagram showing an example of ACK transmission according to Embodiment 1 of the present invention.

FIG. 4 is a sequence diagram showing an example of ACK transmission according to the embodiment. In the example of FIG. 4, the ACK monitoring part 43 starts ACK monitoring of the smallest payload data at a monitoring start time Ts. The protocol control part 33 transmits $n^{th}$ smallest payload data to the PLC 10 at the monitoring start time Ts. In the PLC 10, the protocol control part 14 receives the $n^{th}$ smallest payload data and store the data on the memory 12. Here, the protocol control part 14 does not transmit the ACK that the $n^{th}$ smallest payload data is written to the protocol control part 33. The protocol control part 33 continuously transmit $(n+1)^{th}$ to $(n+3)^{th}$ smallest payload data to the PLC 10 in sequence. The protocol control part 14 receives these pieces of smallest payload data and writes the data on the memory 12. Here, when writing of the $(n+3)^{th}$ smallest payload data is terminated, the protocol control part 24 generates the ACK that total four pieces of $n^{th}$ to $(n+3)^{th}$ smallest payload data are written, and transmits the data to the protocol control part 33. ACK: n+3 in FIG. 4 indicates that the ACK is a writing completion report related to the $n^{th}$ to $(n+3)^{th}$ smallest payload data.

The protocol control part 33 outputs the received ACK: n+3 to the ACK monitoring part 43. The ACK monitoring part 43 determines that the point of time when the ACK: n+3 is received is a monitoring termination time Te. Then, a transmission time corresponding to one of the four pieces of smallest payload data n to n+3, which are continuously transmitted, is calculated based on the monitoring start time Ts and the monitoring termination time Te. Specifically, the transmission time is calculated by dividing the elapsed time from the monitoring termination time Te to the monitoring start time Ts by 4.

The ACK monitoring part 43 determines whether the calculated transmission time exceeds the reference value, and outputs the prohibition signal to the smallest payload data generating part 41 when it is determined as exceeding.

In the example of FIG. 4, even in the control system 1 that does not transmit the ACK for each transmitted smallest payload data and transmits the ACK for each of the plurality of lump smallest payload data, it is possible to determine whether a transmission delay (i.e., the memory contention) of the smallest payload data occurs upon transmission of the large capacity data. Accordingly, it is possible to minimize occurrence of the memory contention after occurrence of the transmission delay. In the example of FIG. 4, further, since the number of determination executions is reduced in comparison with the case in which determination processing is executed for each smallest payload data, it is possible to reduce a determination load in the control system 1.

(Continuous Occurrence of Memory Contention)

Figure 5:
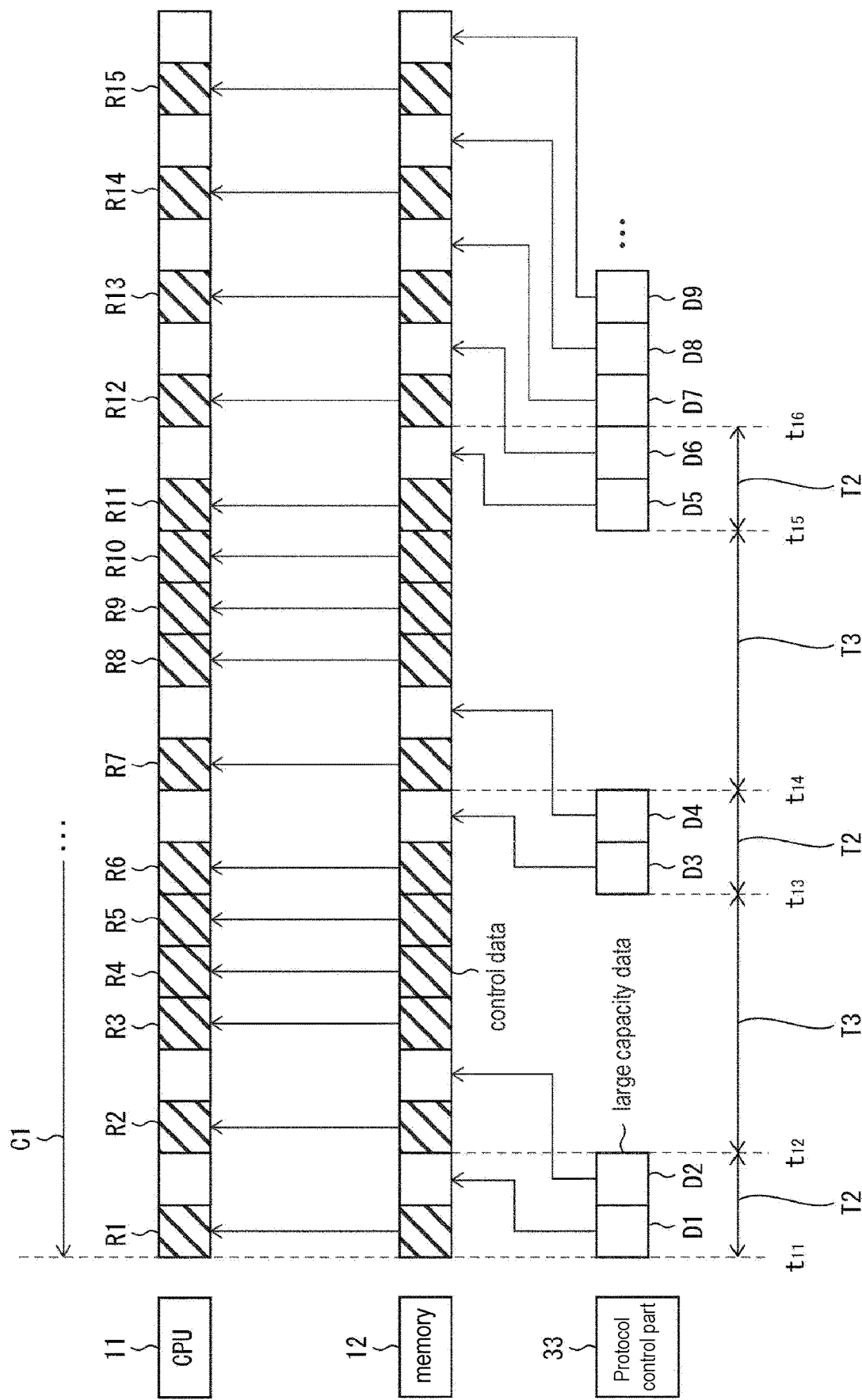
FIG. 5 is a sequence diagram showing another example of a flow of processing by the control system according to Embodiment 1 of the present invention.

FIG. 5 is a sequence diagram showing another example of a flow of processing by the control system 1 according to the embodiment. In the example of FIG. 5, the CPU 11 reads the control data with a larger capacity than in FIG. 2 from the CPU 11. Specifically, the control data constituted by fifteen pieces of smallest payload data R1 to R15 are stored in the memory 12, and the CPU 11 reads this from the CPU 11 in the control cycle C1. A long time is required due to the transfer because a capacity of the control data is large, and thus, it is more likely to cause the memory contention.

For example, at the time t11 at the start point of time in the control cycle C1, since the CPU 11 is trying to read the smallest payload data R1 from the memory 12 and the protocol control part 33 is trying to write the smallest payload data D1 on the memory 12, the memory contention occurs. Accordingly, the ACK monitoring part 43 determines that the transmission time T2 of the smallest payload data D1 exceeds the reference value at the time t12 when the transmission of the smallest payload data D1 is completed. As a result, the communication interface 42 stands by the transmission of the smallest payload data D3 during the duration T3 after the time t12. The communication interface 42 receives the transmission instruction of the smallest payload data D3 from the smallest payload data generating part 41 at the time t13, and thus, transmits the smallest payload data D3 to the memory 12 at the time t13.

In the example of FIG. 5, since the CPU 11 is trying to read the smallest payload data R6 from the memory 12 at the time t15 and the protocol control part 33 is trying to write the smallest payload data D3 on the memory 12, the memory contention occurs. That is, after the transmission is on standby by the duration T3, the memory contention occurs again. Accordingly, the ACK monitoring part 43 determines that the transmission time T2 of the smallest payload data D3 exceeds the reference value at the time t15 when transmission of the smallest payload data D3 is completed. As a result, the communication interface 42 stands by transmission of the smallest payload data D5 during the duration T3 after the time t14. The communication interface 42 receives the transmission instruction of the smallest payload data D5 from the smallest payload data generating part 41 at the time t15, and thus, transmits the smallest payload data D3 to the memory 12 at the time t15.

In the example of FIG. 5, since the CPU 11 is trying to read the smallest payload data R11 from the memory 12 at the time t15 and the protocol control part 33 is trying to write the smallest payload data D5 on the memory 12, the memory contention occurs. That is, after the transmission is on standby by the duration T3, the memory contention occurs again. Accordingly, the ACK monitoring part 43 determines that the transmission time T2 of the smallest payload data D3 exceeds the reference value at the time t16 when transmission of the smallest payload data D3 is completed.

The ACK monitoring part 43 determines whether events that the transmission time of the smallest payload data exceeds the reference value occur continuously constant times at the time t16. In FIG. 5, three times are previously set to the unit 20 as the certain number. Accordingly, the ACK monitoring part 43 determines that the events that the transmission time of the smallest payload data exceeds the reference value occur continuously the constant times. As a result, the ACK monitoring part 43 does not output the prohibition signal to the smallest payload data generating part 41 at the time t16. Accordingly, the smallest payload data generating part 41 outputs immediately the transmission instruction of the smallest payload data D7 transmitted after the smallest payload data D6 that has been transmitted at the point of time upon the time t16 to the ACK monitoring part 43 and the communication interface 42 without waiting for the lapse of the duration T3. Accordingly, the communication interface 42 transmits the smallest payload data D7 to the memory 12 at the time t16. After that, the ACK monitoring part 43 does not transmit the prohibition signal to the smallest payload data generating part 41 regardless of the transmission time of each smallest payload data. Accordingly, the smallest payload data generating part 41 outputs the transmission instruction to the communication interface 42 for each prescribed constant time with respect to the smallest payload data D8, D9, . . . transmitted after the smallest payload data D7.

As shown in FIG. 5, after transmission of the smallest payload data D7, reading any one of the smallest payload data R12 to R15 and writing any one of the smallest payload data D6 to D9 always cause the memory contention. Meanwhile, after the time t16, since the transmission of the large capacity data is executed without waiting for the duration T3, while causing the memory contention, transmission of the large capacity data will be executed little by little without waiting for transfer completion of the control data. Accordingly, it is possible to prevent transmission of the large capacity data from being delayed more than necessity when the memory contention occurs repeatedly.

Embodiment 2

Hereinafter, an embodiment related to another aspect of the present invention (hereinafter, also referred to as "the embodiment") will be described with reference to the accompanying drawings.

§ 2 Configuration Example (Configuration of Control System 1A)

Figure 6:
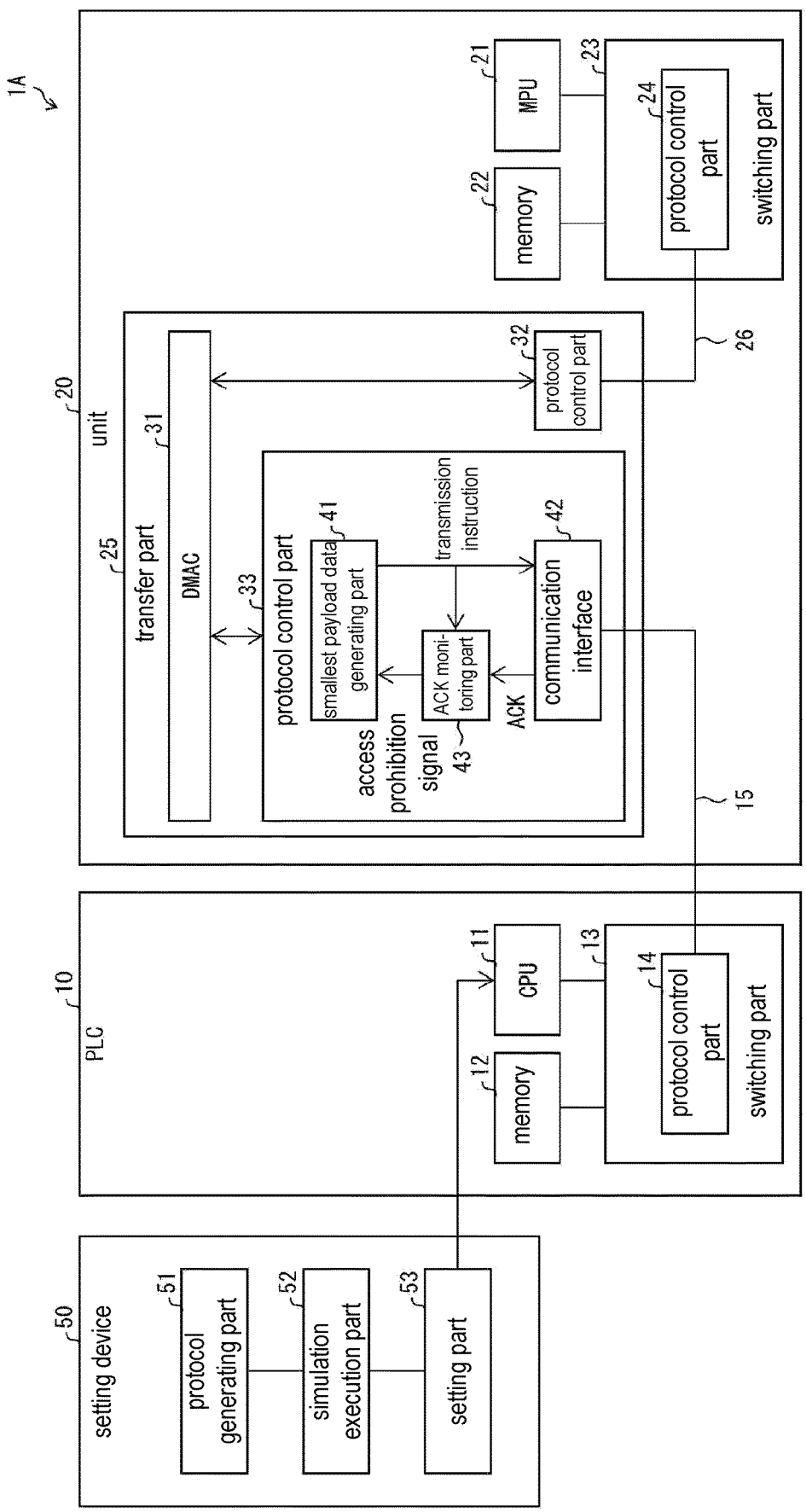
FIG. 6 is a block diagram showing a major part configuration of a control system according to Embodiment 2 of the present invention.

FIG. 6 is a block diagram showing a major part configuration of the control system 1A according to the embodiment. In the example shown, the control system 1 includes the PLC 10, the unit 20, and a setting device 50. Since internal configurations of the PLC 10 and the unit 20 of FIG. 6 are the same as the internal configurations of the PLC 10 and the unit 20 of FIG. 1, respectively, detailed description thereof will not be repeated.

The setting device 50 is an external device connected to the PLC 10 and operated by a user such as a manager or the like of the control system 1. The setting device 50 includes a program creating part 51, a simulation execution part 52, and a setting part 53. The setting part 53 is connected to the CPU 11 of the PLC 10. The PLC 10 is a device configured to execute a program created by a user, and the setting device 50 is a device configured to allow the user to create the program.

The program creating part 51 creates a program executed in the PLC 10 according to the operation of the setting device 50 by the user. The setting part 53 provides the created program to the CPU 11. The CPU 11 executes the provided program. The simulation execution part 52 executes the created program through simulation. In other words, a behavior when the CPU 11 executes the program in the PLC 10 is simulated in the setting device 50. The simulation execution part 52 calculates a communication time when the CPU 11 communicates the control data with the memory 12 through simulation by executing the created program through simulation.

Figure 7:
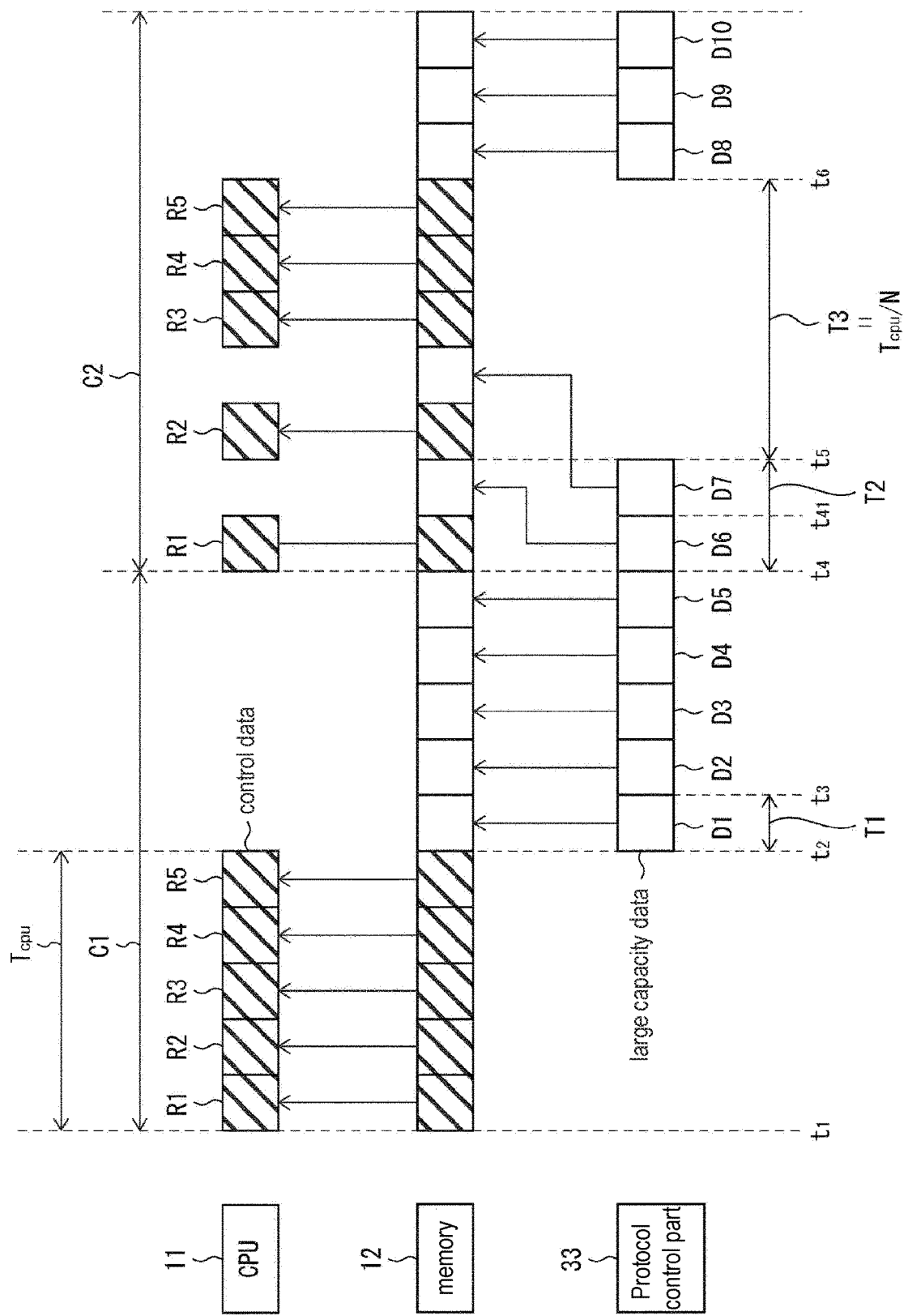
FIG. 7 is a sequence diagram according to an example of a flow of processing by the control system according to Embodiment 2 of the present invention.

FIG. 7 is a sequence diagram showing an example of a flow of processing by the control system 1 according to the embodiment. In the example of FIG. 7, the simulation execution part 52 calculates a time Tcpu required for transfer of the control data constituted by the five pieces of smallest payload data R1 to R5. The setting part 53 outputs the calculated time Tcpu to the CPU 11. The CPU 11 generates information indicating the received time Tcpu, and transmits the information to the protocol control part 33 via the serial bus 15. In the protocol control part 33, the communication interface 42 receives the information indicating the time Tcpu, and outputs the information to the ACK monitoring part 43. In other words, the communication interface 42 acquires the information indicating the time Tcpu from the CPU 11. The ACK monitoring part 43 outputs the input information to the smallest payload data generating part 41. The smallest payload data generating part 41 sets the duration T3 to the unit 20 based on the information indicating the input time Tcpu. In the example of FIG. 7, the duration T3 is set by dividing the time Tcpu by a predetermined coefficient N. The coefficient N is previously set to the unit 20. In the example of FIG. 7, N=1. That is, a length of the duration T3 is equal to the time Tcpu calculated through simulation. A value of N may be an arbitrary value according to an operational status of the control system 1, for example, may be 2 or 4. The user can set the value of the coefficient N to the setting device 50. In this case, the setting part 53 outputs the value of the coefficient N set by the user to the CPU 11. The CPU 11 provides the value of the coefficient N to the smallest payload data generating part 41 via the serial bus 15 or the like, similar to the case in which the time Tcpu is provided to the protocol control part 33. The smallest payload data generating part 41 sets the provided value of the coefficient N to the unit 20.

(Main Effects)

Since the duration T3 can be set based on the time Tcpu calculated through simulation, an appropriate duration T3 can be automatically set to the unit 20. That is, since each user of the control system 1 does not have to calculate the duration T3 by oneself, the user's trouble of setting an appropriate duration T3 to the unit 20 can be eliminated. In other words, the smallest payload data generating part 41 can automatically set the appropriate duration T3 to the unit 20 as long as the user creates the program executed by the PLC 10 in his/her control system 1.

(Variant)

The CPU 11 can measure the transfer time when the CPU 11 transfers the control data to and from the memory 12 during the operation of the PLC 10, i.e., during execution of the program created by the user. The CPU 11 corrects the information indicating the time Tcpu provided from the setting part 53 based on the transfer time measured by the CPU 11 when the transfer time is measured. For example, the time Tcpu indicated by the information approaches the transfer time measured by the CPU 11. The CPU 11 transmits the information after correction to the unit 20. Accordingly, the smallest payload data generating part 41 can set the duration T3 to the unit 20 based on the time Tcpu close to the actual transfer time of the control data by the CPU 11. Accordingly, when the memory contention occurs, the communication interface 42 can be on standby for the more appropriate duration T3 until the next smallest payload data is transmitted. In addition, when the transfer time of the control data by the CPU 11 is changed together with advance of an operation of the control system 1, since the time Tcpu can be adjusted appropriately according to the change of the transfer time, the appropriate duration T3 can be continuously set.

[Implemented Example by Software]

The control block (in particular, the transfer part 25 and the DMAC 31) of the unit 20 may be realized by a logical circuit (hardware) constituted by an integrated circuit (IC chip) or the like, or may be realized by software.

In the case of the latter, each of the units 20 and 20A includes a computer configured to execute a command of a program that is software configured to realize each function. The computer includes, for example, at least one processor, and also includes a computer-readable recording medium on which the program is stored. Then, in the computer, the processor is executed by reading the program from the recording medium, and the purposes of the present invention are accomplished. For example, a central processing unit (CPU) can be used as the processor. As the recording medium, "a non-temporary tangible medium," for example, in addition to the read only memory (ROM), a tape, a disk, a card, a semiconductor memory, a programmable logical circuit, and the like, can be used. In addition, the random access memory (RAM) or the like configured to deploy the program may be further provided. In addition, the program may be supplied to the computer via an arbitrary transmission medium (a communication network, a broadcast medium, or the like) that can transmit the program. Further, the aspect of the present invention can also be realized in the form of a data signal embedded in a carrier wave, in which the program is embodied through electronic transmission.

CONCLUSION

The information processing device according to an aspect of the present invention is an information processing device connected to a control device including a first memory connected to a serial bus, and a first communication part connected to the serial bus and configured to communicate with the first memory via the serial bus, the information processing device including: a generating part configured to generate a plurality of pieces of smallest payload data from communication data transmitted to the first memory via the serial bus; a transmission part configured to sequentially transmit the smallest payload data to the first memory via the serial bus at each constant time; a computation part configured to calculate a transmission time of the smallest payload data transmitted by the transmission part at a first point of time; a determination part configured to determine whether the calculated transmission time exceeds a predetermined reference value; and a transmission control part configured to cause the transmission part to stand by for transmission of the smallest payload data during a constant duration from a second point of time when it is determined that the transmission time has been determined as exceeding the reference value to a third point of time when the transmission part transmits the smallest payload data transmitted after the latest smallest payload data that has been transmitted at the second point of time.

According to the configuration, when it is determined that the transmission time of the smallest payload data transmitted to the first memory at the first point of time exceeds the predetermined reference value, the transmission of the smallest payload data transmitted next to the latest smallest payload data that has been transmitted at the second point of time determined in this way is on standby for a constant duration. Accordingly, since the second communication part does not transmit the communication data to the first memory during the constant duration after the second point of time, a memory contention does not occur between the first communication part and the second communication part. Here, since avoidance of the memory contention is realized based on the transmission time of the smallest payload data calculated by the computation part, the first communication part does not need to execute arbitration processing to prevent memory contention. In this way, the information processing device according to the aspect of the present invention can minimize occurrence of memory contention without causing the first communication part of the control device to execute arbitration processing to prevent the memory contention. Accordingly, a load of the first communication part can be reduced.

In the above-mentioned configuration, the information processing device according to the aspect of the present invention includes a reception part configured to receive a completion report indicating that the smallest payload data transmitted at the first point of time is written on the first memory, and the computation part calculates the transmission time based on the first point of time and a point of time when the completion report is received.

According to the configuration, when the memory contention occurs, since the fact can be quickly determined, a measure can be quickly taken to minimize the memory contention upon occurrence of the memory contention.

In the above-mentioned configuration, in the information processing device according to the aspect of the present invention, the reception part receives the completion report indicating that the plurality of continuously transmitted smallest payload data are written on the first memory, the computation part calculates the transmission time of each of the smallest payload data based on the first point of time and the point of time when the completion report is received, and the determination part determines whether the transmission time of each of the smallest payload data exceeds the reference value.

According to the configuration, the present invention can also be applied to the information processing device configured to conclusively receive a writing completion report for the plurality of pieces of smallest payload data. In addition, since the number of executions of determination can be reduced, a load of determination in the information processing device can be reduced.

In the above-mentioned configuration, in the information processing device according to the aspect of the present invention, the control device is connected to an external device configured to calculate a transmission time when the first communication part transfers first data to and from the first memory through simulation and configured to provide information indicating the calculated transmission time to the control device, and includes: an acquisition part configured to acquire the information provided from the external device to the control device from the control device, and a setting part configured to set the constant duration based on the information.

According to the configuration, since the constant duration can be set based on the time calculated through simulation, an appropriate constant duration can be automatically set to the information processing device. That is, since it is not necessary for each user of the control system to calculate a constant duration by himself/herself, it is possible to eliminate the user's trouble for setting an appropriate constant duration.

In the above-mentioned configuration, in the information processing device according to the aspect of the present invention, the first communication part measures a transmission time when the first data is transmitted to the first memory during an operation of the control device and corrects information indicating the transmission time based on the measured transmission time, and the acquisition part acquires the corrected information from the control device.

According to the configuration, when the transfer time of the first data by the first communication part is changed together with advance of the operation of the control system, since the set constant duration can be appropriately prepared according to the change of the transfer time, the appropriate constant duration can be continuously set to the information processing device.

In the above-mentioned configuration, in the information processing device according to the aspect of the present invention, the transmission control part makes the transmission part transmitting the next smallest payload data without making the transmission part stand by when the events that the transmission time is determined as exceeding the reference value occur continuously constant times.

According to the configuration, it is possible to prevent transmission of the communication data from being delayed more than necessity.

The present invention is not limited to each of the above-mentioned embodiments described above, and various modifications may be made without departing from the scope shown in the claims. Embodiments obtained by appropriately combining the technical means disclosed in different embodiments are also included in the technical scope of the present invention. New technical features can also be formed by combining the technical means disclosed in each embodiment.

What is claimed is:

1. An information processing device connected to a control device comprising a first memory connected to a serial bus, and a first communication part connected to the serial bus and configured to communicate with the first memory via the serial bus, the information processing device comprising:
   a generating part configured to generate a plurality of pieces of smallest payload data from communication data transmitted to the first memory via the serial bus;
   a transmission part configured to sequentially transmit the smallest payload data to the first memory via the serial bus at each constant time;
   a computation part configured to calculate a transmission time of the smallest payload data transmitted by the transmission part at a first point of time;
   a determination part configured to determine whether the calculated transmission time exceeds a predetermined reference value; and
   a transmission control part configured to cause the transmission part to stand by for transmission of the smallest payload data during a constant duration from a second point of time when it is determined that the transmission time has been determined as exceeding the reference value to a third point of time when the transmission part transmits the smallest payload data transmitted after the latest smallest payload data that has been transmitted at the second point of time,
   wherein the control device is connected to an external device configured to calculate a transmission time when the first communication part transfers first data to and from the first memory through simulation and configured to provide information indicating the calculated transmission time to the control device, and the information processing device comprises:
   an acquisition part configured to acquire the information provided from the external device to the control device from the control device, and
   a setting part configured to set the constant duration based on the information.

2. The information processing device according to claim 1, comprising a reception part configured to receive a completion report indicating that the smallest payload data transmitted at the first point of time is written on the first memory,
   wherein the computation part calculates the transmission time based on the first point of time and a point of time when the completion report is received.

3. The information processing device according to claim 2, wherein the reception part receives the completion report indicating that the plurality of pieces of continuously transmitted smallest payload data is written on the first memory,
   the computation part calculates the transmission time of each of the pieces of smallest payload data based on the first point of time and the point of time when the completion report is received, and the determination part determines whether the transmission time of each of the pieces of smallest payload data exceeds the reference value.

4. The information processing device according to claim 1, wherein the first communication part measures a transmission time when the first data is transmitted to the first memory during an operation of the control device and corrects information indicating the transmission time based on the measured transmission time, and the acquisition part acquires the corrected information from the control device.

5. The information processing device according to claim 1, wherein the transmission control part makes the transmission part transmit the next smallest payload data without making the transmission part stand by when an event in which the transmission time is determined as exceeding the reference value occurs a certain number of times in succession.

6. The information processing device according to claim 2, wherein the transmission control part makes the transmission part transmit the next smallest payload data without making the transmission part stand by when an event in which the transmission time is determined as exceeding the reference value occurs a certain number of times in succession.

7. The information processing device according to claim 3, wherein the transmission control part makes the transmission part transmit the next smallest payload data without making the transmission part stand by when an event in which the transmission time is determined as exceeding the reference value occurs a certain number of times in succession.

8. The information processing device according to claim 4, wherein the transmission control part makes the transmission part transmit the next smallest payload data without making the transmission part stand by when an event in which the transmission time is determined as exceeding the reference value occurs a certain number of times in succession.

* * * * *